United States Patent
Wetzl et al.

(10) Patent No.: US 7,267,514 B2
(45) Date of Patent: Sep. 11, 2007

(54) SELF-CENTERING DRILL BIT WITH PILOT TIP

(75) Inventors: Alfons Wetzl, Slazweg (DE); Markus Rompel, Runkel/Schadeck (DE)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/935,398

(22) Filed: Sep. 7, 2004

(65) Prior Publication Data

US 2005/0053438 A1    Mar. 10, 2005

(30) Foreign Application Priority Data

Sep. 8, 2003   (GB) ................... 0320962.4
Oct. 27, 2003  (GB) ................... 0324996.8

(51) Int. Cl.
*B23B 51/02* (2006.01)
(52) U.S. Cl. ...................... 408/225; 408/230
(58) Field of Classification Search ............... 408/223, 408/224, 225, 227, 230
See application file for complete search history.

(56) References Cited

U.S. PATENT DOCUMENTS

| 4,605,347 A | * | 8/1986 | Jodock et al. ............. 408/224 |
| 4,878,788 A | * | 11/1989 | Wakihira et al. ........... 408/230 |
| 4,967,855 A | * | 11/1990 | Moser ........................ 175/394 |
| 4,968,193 A | * | 11/1990 | Chaconas et al. .......... 408/211 |
| 5,288,183 A | * | 2/1994 | Chaconas et al. .......... 408/211 |

(Continued)

FOREIGN PATENT DOCUMENTS

DE        41 17 486 A1    12/1992

(Continued)

*Primary Examiner*—Monica Carter
*Assistant Examiner*—Michael W. Talbot
(74) *Attorney, Agent, or Firm*—Harness, Dickey & Pierce, P.L.C.

(57) ABSTRACT

An elongate drill bit (20) with a longitudinal axis (X-X) has a shank (28), a working end (24), and a fluted section (26) between the shank and the working end. The shank, the working end and the fluted section are all formed integrally in the drill bit. The working end has an outer cutting portion (34) and a central pilot tip (36) which extends axially ahead of the outer cutting portion. The pilot tip is formed with at least one pair of minor cutting edges (40, 42; 44, 46) arranged on opposite sides of the axis. The outer cutting portion is formed with a pair of major cutting edges (70, 72) arranged on opposite sides of the axis. The outer cutting portion has a major diameter (D) defined by the pair of major cutting edges. The pilot tip has a minor diameter (d) defined by the at least one pair of minor cutting edges. The fluted section has a pair of helical lands (32) each with a respective inner surface (92) extending axially rearward from one of the major cutting edges and from one of the minor cutting edges. The helical lands define a web (94). Each helical land defines a respective helical flute (30). The helical lands have a pitch (S) and the web has a web thickness (K) at the pilot tip such that the ratio of the pitch to the major diameter (S:D) falls within a range of about 380% to about 410%. Also, the ratio of the minor diameter to the web thickness at the pilot tip (d:K) falls within a range of about 220% to about 380%.

13 Claims, 5 Drawing Sheets

U.S. PATENT DOCUMENTS

| | | | |
|---|---|---|---|
| 6,050,754 A * | 4/2000 | Thomas | 408/230 |
| 6,089,337 A * | 7/2000 | Kleine et al. | 175/394 |
| 6,102,634 A * | 8/2000 | Turner et al. | 408/224 |
| 6,190,097 B1 * | 2/2001 | Thomas | 408/230 |
| 6,227,774 B1 * | 5/2001 | Haughton et al. | 408/225 |
| 6,312,432 B1 * | 11/2001 | Leppelmeier | 606/80 |
| 6,443,674 B1 * | 9/2002 | Jaconi | 408/1 R |
| 6,652,203 B1 * | 11/2003 | Risen, Jr. | 408/225 |
| 6,857,832 B2 * | 2/2005 | Nygård | 408/211 |
| 2003/0017015 A1 * | 1/2003 | Strubler | 408/230 |
| 2003/0202853 A1 * | 10/2003 | Ko et al. | 408/225 |

FOREIGN PATENT DOCUMENTS

| | | |
|---|---|---|
| EP | 0 893 185 A1 | 1/1999 |
| EP | 1260296 A1 * | 11/2002 |
| GB | 2 193 913 A | 2/1988 |
| JP | 2001-105216 | 4/2001 |
| WO | WO 2004037472 A1 * | 5/2004 |

\* cited by examiner

SELF-CENTERING DRILL BIT WITH PILOT TIP

CROSS-REFERENCE TO RELATED APPLICATIONS

This application claims priority to United Kingdom Patent Application Nos. GB 0320962.4 filed Sep. 8, 2003 and 0324996.8 filed Oct. 27, 2003, which applications are herein expressly incorporated by reference.

FIELD OF THE INVENTION

The present invention relates to a drill bit for cutting accurately formed round holes of uniform diameter through wood, metal and plastics.

BACKGROUND OF THE INVENTION

One of the most commonly used drill bits to drill through metal is a twist drill formed with a chisel edge at the working end of the drill bit. The chisel edge is formed perpendicular to the axis of the drill bit and usually extends across a small portion of the drill bit diameter. Also, the chisel edge extends equally on opposite sides of the drill bit axis. A cutting edge extends from each opposite end of the chisel edge and tapers axially rearward to the outer periphery of the drill bit diameter. In use, the chisel edge is the first portion of the drill bit to engage a workpiece. The chisel edge engages the workpiece and literally works and extrudes the material in the immediate vicinity rather than forming chips, swarf, sawdust and the like for extraction. The worked material enables the drill bit to begin to move into the material of the workpiece whereby the cutting edges begin to cut the material to form removable chips which are discharged via helical flutes running axially rearward from the chisel edge and the cutting edges.

While a drill bit with a chisel edge is satisfactory for some drilling operations, it does not provide holes with accurately located centers or round holes. For example, it tends to "skip" away from the desired location of the hole as the rotating chisel edge engages the workpiece. Further, any out-of-round characteristic of the drill bit or the tool holder connected to the shank of the drill bit is transmitted to the working end while drilling the hole. In addition, a drill bit with a chisel edge typically has a relatively large core, or web, which is slightly less than the length of the chisel edge. Drill bits with a large web require significant thrust in order to urge the drill bit into the workpiece. A larger web also limits the effective space for chip removal through the helical flutes, the radial depth of which is determined by the web thickness.

Patent publication No. EP0315643 discloses a drill bit having a pilot tip which extends axially ahead of an outer cutting portion. The pilot tip has a smaller diameter than the outer cutting portion. In use, the pilot tip cuts a pilot hole which self-centers the drill bit. Next, the outer cutting portion cuts a main hole in the workpiece which corresponds to the diameter of the drill bit.

A drill bit sold by the Applicant under the registered trade mark EXTREME DEWALT™ (hereinafter referred to as the prior art drill bit) also has a pilot tip which extends axially ahead of an outer cutting portion. The pilot tip has a "split point" cutting edge arrangement to cut the self-centering pilot hole and the outer cutting portion has a pair of major cutting edges arranged on opposite sides of the axis to cut the primary hole. The split point has two inner minor cutting edges arranged on opposite sides of the axis. The two inner minor cutting edges are spaced apart and connected at the extreme tip of the split point by a slight chisel edge. The split point also has an outer minor cutting edge that extends from the end of each inner minor cutting edge and tapers axially rearward to the outer periphery of the pilot tip. In use, the two inner minor cutting edges engage a workpiece to initiate the drilling operation slightly in advance of the engagement of the workpiece by the outer minor cutting edges. The chisel edge does not work or extrude the material in its immediate vicinity, like in the case of the common twist drill mentioned above, because the chisel edge is insignificantly small. The chips created by the inner and the outer minor cutting edges are separate from each other and are therefore smaller in size.

Once the pilot tip begins drilling the self-centering pilot hole, the major cutting edges of the outer cutting portion engage the workpiece and create chips which are also separate from those created by the minor cutting edges of the pilot tip. This arrangement produces smaller chips during the drilling operation which, in turn, reduces resistance to the passage of the drill bit through the workpiece as the drilling process progresses. The drill bit has debris channels in the form of a pair of helical flutes to transport the chips away from the cutting edges and out of the hole being drilled in the workpiece. Smaller chips are naturally easier to convey along the flutes and are less likely to clog up the flutes. A clogged flute creates the problem of significantly increased resistance to the passage of the drill bit through the workpiece. Deeper flutes transport such chips and other debris more easily and are less prone to clogging. However, deeper flutes also result in a thinner web that reduces the strength of the dill bit. A compromise is met by a web that tapers radially outwardly and axially rearward from the pilot tip of the working end towards the drill bit shank. This provides deeper flutes in the region of the working end where efficient debris removal is most important. Also, it provides a thicker web towards the shank where robustness is important. The prior art drill bit has a tapering web with a thickness increasing from the tip portion to the shank portion at a uniform taper rate.

SUMMARY OF THE INVENTION

It is an object of the present invention to maintain the strength and self-centering capabilities of prior art drill bits while improving drilling speed. This is achieved by an elongate drill bit with a longitudinal axis. The drill bit comprising a shank, a working end and a fluted section located between the shank and the working end. The shank, the working end and the fluted section are all formed integrally in the drill bit. The working end comprises an outer cutting portion and a central pilot tip which extends axially ahead of the outer cutting portion. The pilot tip is formed with at least one pair of minor cutting edges arranged on opposite sides of the axis. The outer cutting portion is formed with a pair of major cutting edges arranged on opposite sides of the axis. The outer cutting portion has a major diameter (D) defined by the pair of major cutting edges. The pilot tip has a minor diameter (d) defined by the at least one pair of minor cutting edges. The fluted section has a pair of helical lands each with a respective inner surface which extends axially rearward from one of the major cutting edges and from one of the minor cutting edges. The helical lands define a web and each helical land defines a respective helical flute. The helical lands have a pitch (S) and the web has a web thickness (K) at the pilot tip. The ratio of pitch to major diameter, S:D, falls within a range of 380% to 410%. The ratio of minor diameter to web thickness, d:K, at the pilot tip falls within a range of 220% to 380%.

The drill bit of the present invention has a greater minor diameter and smaller web thickness at the pilot tip than prior art drill bits with an equivalent major diameter. The increased minor diameter compensates for the reduced web thickness thereby maintaining the strength of the pilot tip.

Preferably, the pilot tip is formed with a pair of outer minor cutting edges each tapering radially outwardly from a respective inner cutting edge to the periphery of the minor diameter of the pilot tip. This is the split point cutting edge arrangement mentioned in the above passages that results in smaller chips created by the cutting action of the inner and outer minor cutting edges. The minor cutting edges may be separated by a chisel edge perpendicular to the axis.

Preferably, the pair of helical lands and respective land inner surfaces are formed at a helix angle measured with respect to the axis. The helix angle falls within a range of 37° to 40°. Each outer minor cutting edge forms a boundary between a respective land inner surface and a respective minor relief face. Each major cutting edge forms a boundary between a respective land inner surface and a respective major relief face.

The helical lands of drill bit of the present invention have a smaller pitch than prior art drill bits with an equivalent major diameter. This results in a corresponding increase in the helix angle of the helical lands' inner surfaces which reduces the cutting angle of both the major and minor cutting edges. Therefore, in use, the drill bit of the present invention can drill a hole in a workpiece more rapidly since these cutting edges are sharper.

In some tests, the drill bit according to the present invention can cut a hole in certain workpieces twice as fast as the prior art drill bits. However, faster drill bits are more likely to form burrs at the exit mouth of a hole drilled in the workpiece because they often push a final chip out of the way rather than allowing the cutting edges the time to cleanly cut the final chip before it becomes a burr.

Burrs are undesirable because they are sharp and unsightly remains of the drilling operation attached to the exit mouth of the hole. However, the deep flutes formed by the reduced web thickness at the pilot tip counteracts this risk of forming burrs. The deep flutes provides extra space in front of the major cutting edges so that a bigger final chip is formed as the drilling operation is completed. There is always a risk that the final chip cut will remain partially attached to the workpiece around the exit mouth of the hole as the drill bit advances. However, a bigger final chip will have greater strength and remain in place as the outer cutting portion advances so that they can be cleanly cut away by the major cutting edges without forming burrs. Further, the thickness of each land is reduced by the reduction of the web thickness at the pilot tip. This results in a sharpening of an edge defining the boundary between each flute and the respective trailing land in the region of the pilot tip. This sharpened edge helps cut away and remove any final chips missed by the major cutting edges to avoid them from becoming burrs.

The present invention provide drill bits with changes made to the pitch of the helical lands, to the thickness of the web in the region of the pilot tip and to the minor diameter of the pilot tip. The effect of these changes on the drill bit according to the present invention provides surprising results by significantly improving drilling speed without reducing strength or increasing the likelihood of creating burrs at the exit mouth of the hole drilled in a workpiece.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
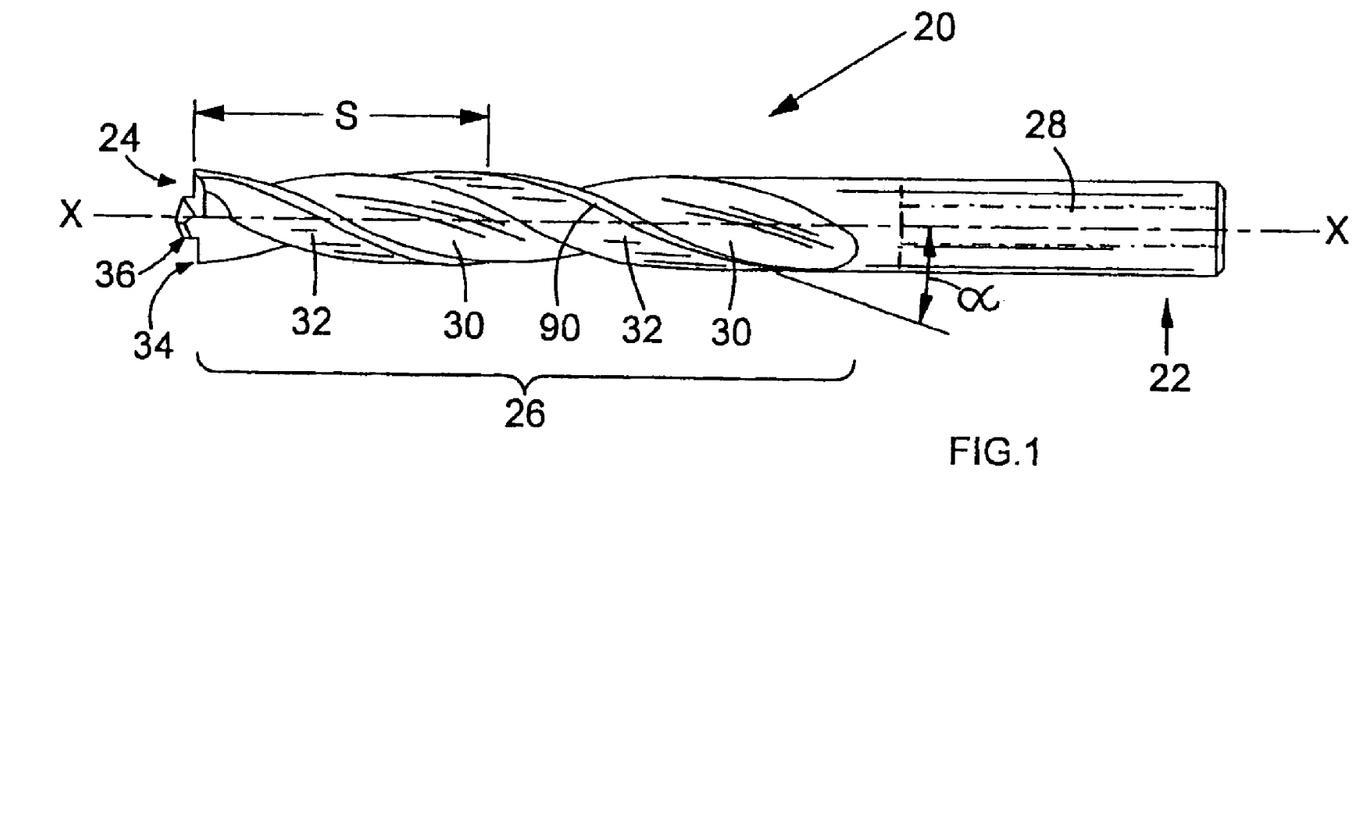
FIG. 1 is a side elevational view of a drill bit according to the present invention.

Referring to FIG. 1, a drill bit 20 is shown for cutting a variety of material such as metal, wood, plastics, plastics, piping and tubing. The drill bit 20 has a longitudinal axis X-X and is manufactured from high-speed steel. The drill bit 20 has a shank end 22, a working end 24 and a fluted section 26 interposed between the shank end 22 and the working end 24. The shank end 22 includes a substantially cylindrical shank 28 that extends from one end of the drill bit 20 to the fluted section 26. The shank 28 connects to a tool holder (not shown) of a power tool. Optionally, the shank 28 may have a plurality of axially parallel flat chamfers arranged equiangularly around its circumference (as shown in phantom in FIGS. 1 and 8) to improve the connection with a tool holder of a power tool. The fluted section 26 is formed with a pair of helical flutes 30 defined by a pair of helical lands 32 formed at a prescribed helix angle $\alpha$ measured with respect to the axis X-X. The helical flutes 30 and the helical lands 32 extend axially rearward from the working end 24 to the shank 28 and each have a pitch S. The pitch S is controlled by the helix angle $\alpha$. The helix angle a falls within a range of about 37° to about 40°.

Referring to FIGS. 2 to 5, the working end 24 includes an outer cutting portion 34 with a major diameter D and a pilot tip 36 with a minor diameter d that is smaller than the major diameter D. The pilot tip 36 is formed integrally with and extends a short distance L1 axially ahead of the outer cutting portion 34. The pilot tip 36 has a split point cutting edge arrangement at its extreme end 38. The cutting edge arrangement is formed with a pair of inner minor cutting edges 40, 42 separated by a slight chisel edge 38 extending between the cutting edges 40, 42. The chisel edge 38 is perpendicular to the axis X-X. The split point is also formed with a pair of outer minor cutting edges 44, 46. Each minor cutting edge tapers radially outwardly from a respective inner minor cutting edge 40, 42 to the periphery of the minor diameter d of the pilot tip 36. The split point is also formed with a pair of minor relief faces 48, 50. Each relief face is formed behind a respective pair of leading inner and outer minor cutting edges 40, 44, 42, 46 (in the direction of rotation R) to provide relief behind these cutting edges. Each inner minor cutting edge 40, 42 forms a boundary between a leading rake face 52, 54 and a respective trailing minor relief face 48, 50 (in the direction of rotation R).

The pilot tip 36 is also formed with a pair of rounded circumferential outer surfaces 56, 58. Each outer surface 56, 58 extends axially rearward on opposite sides of the pilot tip 36. The outer surface 56 is formed with a forward edge 60 and a trailing edge 62 (in the direction of rotation R). The outer surface 58 is formed with a forward edge 64 and a trailing edge 66 (in the direction of rotation R).

Figure 4:
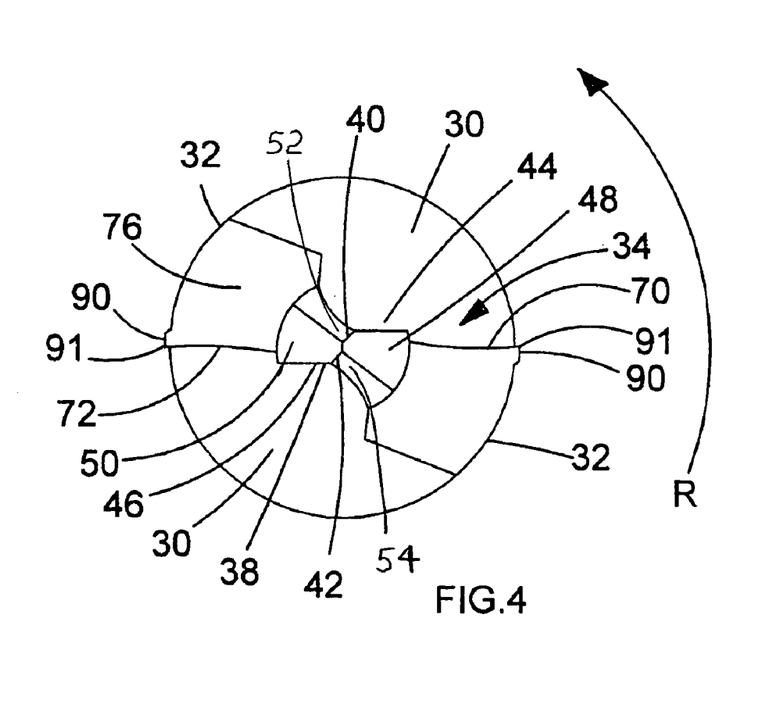
FIG. 4 is a plan view of the drill bit of FIG. 1.

When viewed from above, as shown in FIG. 4, the outer surfaces 56, 58 are generally rounded but are also curved radially inwardly as the outer surfaces extend from a respective forward edge 60, 64 to a respective trailing edge 62, 66. This is clearly shown in FIG. 7, where the outer surfaces 56, 58 curve radially inwardly of a true circle represented by dashed line 68 thereby creating a radial relief RR. Accordingly, the outer surfaces 56, 58 each provide relief behind a respective forward edge 60, 64.

Figure 5:
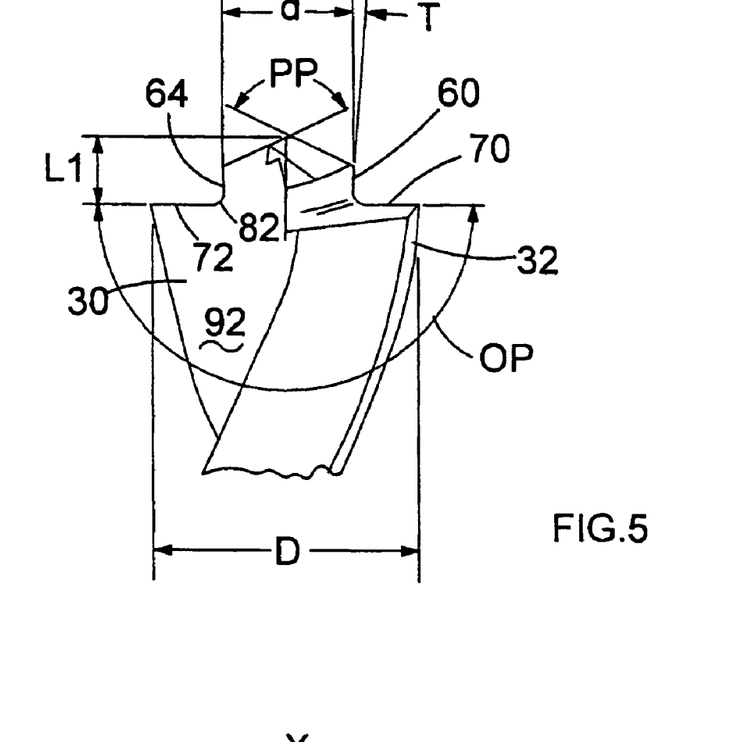
FIG. 5 is a side elevational schematic view of the working end of the drill bit of FIG. 1.

When viewed from the side, as shown in FIG. 5, the outer surfaces 58, 60 are generally straight but are also slightly tapered radially inwardly as the outer surfaces extend axially rearward. The rearward taper T of each outer surface 56, 58 is approximately 1° to 3° measured from a plane parallel to the axis X-X. Accordingly, the outer surfaces 56, 58 also provide relief behind the pilot tip 36.

Returning to FIGS. 2 to 5, the outer cutting portion 34 is formed with a pair of major cutting edges 70, 72. Each major cutting edge 70, 72 has a respective trailing major relief face 74, 76 (in the direction of rotation R). Each major cutting edge 70, 72 runs radially inwardly in a straight line from the periphery of the major diameter D towards the pilot tip 36. In the region adjacent the pilot tip 36 the major cutting edge 70 begins to curve towards the working end 24 to form a radius at a forward edge 78 of a fillet 80. The major cutting edge 70 merges with the forward edge 60 of the outer surface 56 at the fillet 80. Likewise, the major cutting edge 72 extends from the periphery of the major diameter D towards the pilot tip 36 and eventually curves in an identical manner into a radius at a forward edge 82 of a fillet 84. The major cutting edge 72 merges with the forward edge 64 of the outer surface 58 at the fillet 84.

Each fillet 80, 84 begins at a respective forward edge 78, 82 with a relatively large radius and extends rearward in a curved path from the respective forward edge 78, 82, wherein the radius becomes progressively smaller until each fillet terminates in an approximately right-angle shaped corner 86, 88, respectively. In addition, each fillet 80, 84 extends radially inward from the respective forward edge 78, 82 to a respective trailing corner 86, 88 in the same manner as the rounded outer surfaces 56, 58. Accordingly, the fillets 80, 84 create relief behind the forward edges 78, 82.

As discussed above, relief is provided behind the edges mentioned above. For example, the major relief face 74, the fillet 80, and the outer surface 56, which trail, the major cutting edge 70, the fillet forward edge 78 and the pilot tip forward edge 60, respectively, create relief behind these edges in the manner described above. Thus, when the drill bit 20 is used to drill a hole in a workpiece, these trailing surfaces do not engage and rub against the walls of the hole. Similarly, the major relief face 76, the fillet 84, and the outer surface 58, which trail, the major cutting edge 72, the fillet forward edge 82 and the pilot tip forward edge 64, respectively, also create relief behind these edges. Thus, when the drill bit 20 is used to drill a hole in a workpiece, these trailing surfaces do not engage and rub against the walls of the hole.

Figure 2:
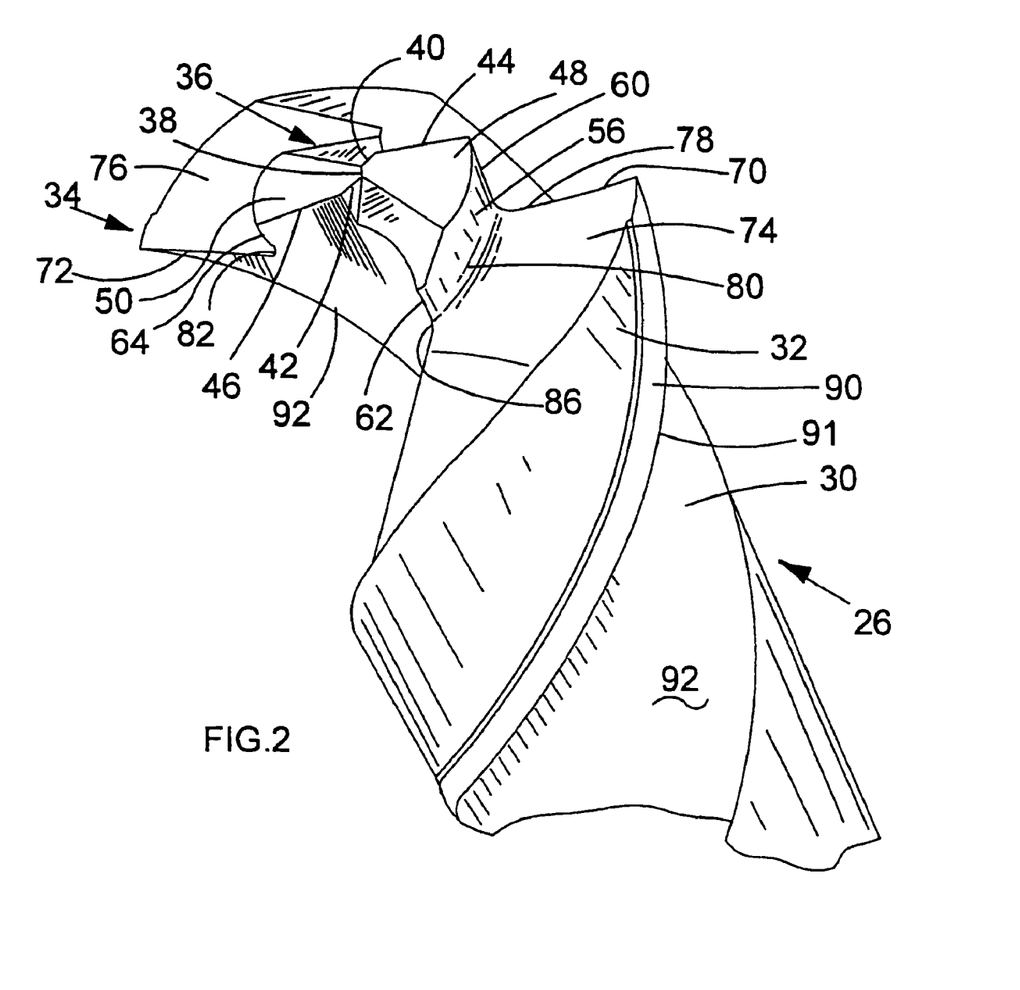
FIG. 2 is a perspective view of a working end of the drill bit of FIG. 1 from one side.
Figure 3:
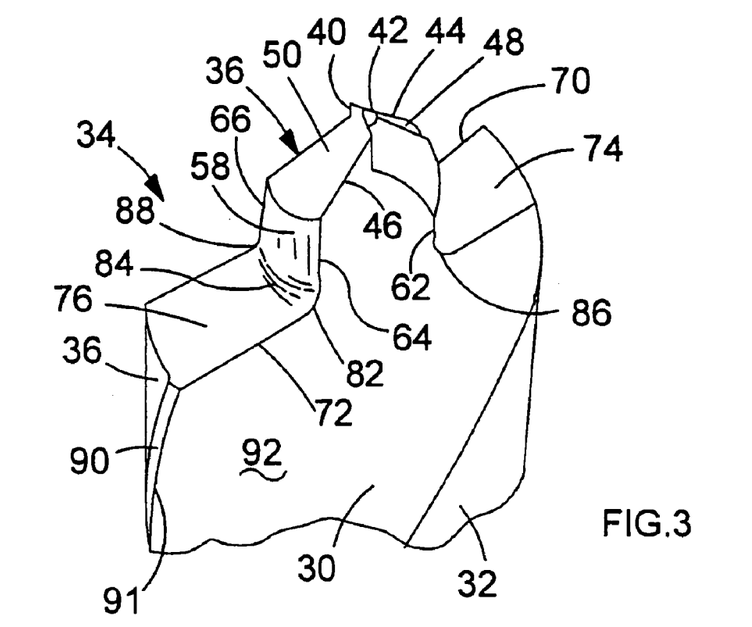
FIG. 3 is a perspective view of the working end of the drill bit of FIG. 1 from another side.

As is shown in FIG. 2, each helical land 32 has a helical margin 90 on a leading edge 91 (in the direction of rotation R) of its circumferential outer face. The margin 90 protrudes radially slightly beyond the circumferential outer face of a respective land and is narrower than the circumferential outer face. The helix defined by each margin 90 defines the major diameter D. The margins 90 engage the walls of the hole to provide support to the drill bit 20 as it drills into a workpiece. Friction between the walls of the hole and the drill bit 20 is thus reduced because the margins 90 have a smaller surface area than the circumferential outer faces of the lands 26.

Figure 6:
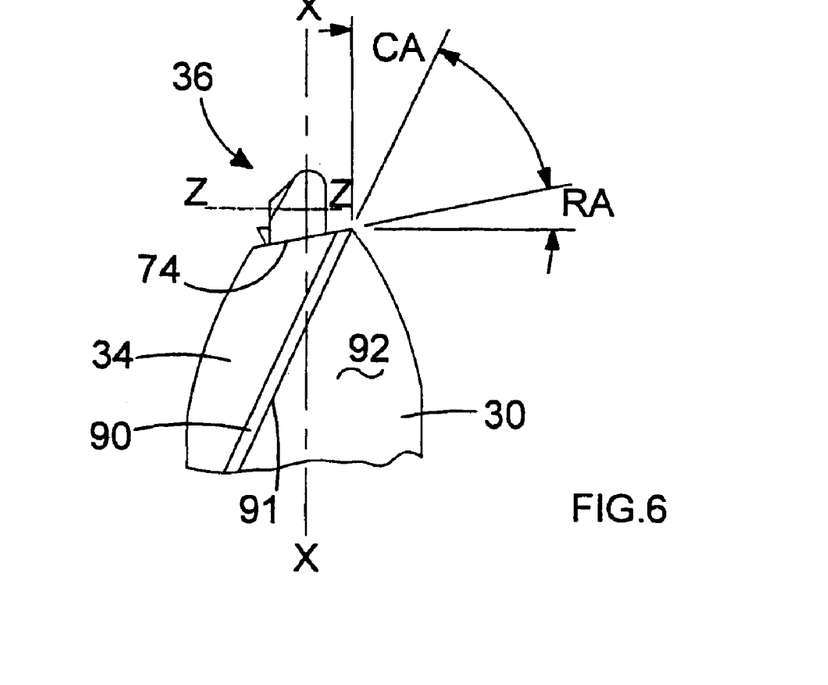
FIG. 6 is a side elevational schematic view of the working end of the drill bit of FIG. 5 rotated through 90°.

Referring to FIG. 6, a major relief angle RA of each major relief face 74, 76 is measured from a plane perpendicular to the axis X-X. The major relief angle RA falls within a range of about 8° to about 12° for those drill bits with a major diameter D of less than 8 mm. The major relief angle RA falls within a range of about 7° to about 12° for those drill bits with a major diameter D of greater than 8 mm.

Each helical land 32 has an inner surface 92 that defines the shape of a respective flute 34. Each land inner surface 92 extends axially rearward from a respective outer minor cutting edge 44, 46 and a respective major cutting edge 70, 72. Each outer minor cutting edge 44, 46 forms a boundary between a respective land inner surface 92 and a respective minor relief face 48, 50. Likewise, each major cutting edge 70, 72 forms a boundary between a respective land inner surface 92 and a respective major relief face 74, 76. The land inner surfaces 92 act as a rake face to both the outer minor cutting edges 44, 46 and the major cutting edges 70, 72. Accordingly, the land inner surfaces 92 each effectively have a rake face angle CA, as measured from a plane parallel to the axis X-X, that is equal to the helix angle $\alpha$. The cutting angle of the major cutting edges 70, 74 equals 90°−(CA+RA). The cutting angle of the outer minor cutting edges 44, 46 equals 90°−(CA+the relief angle of the minor relief face 48, 50).

Figures 7, 8:
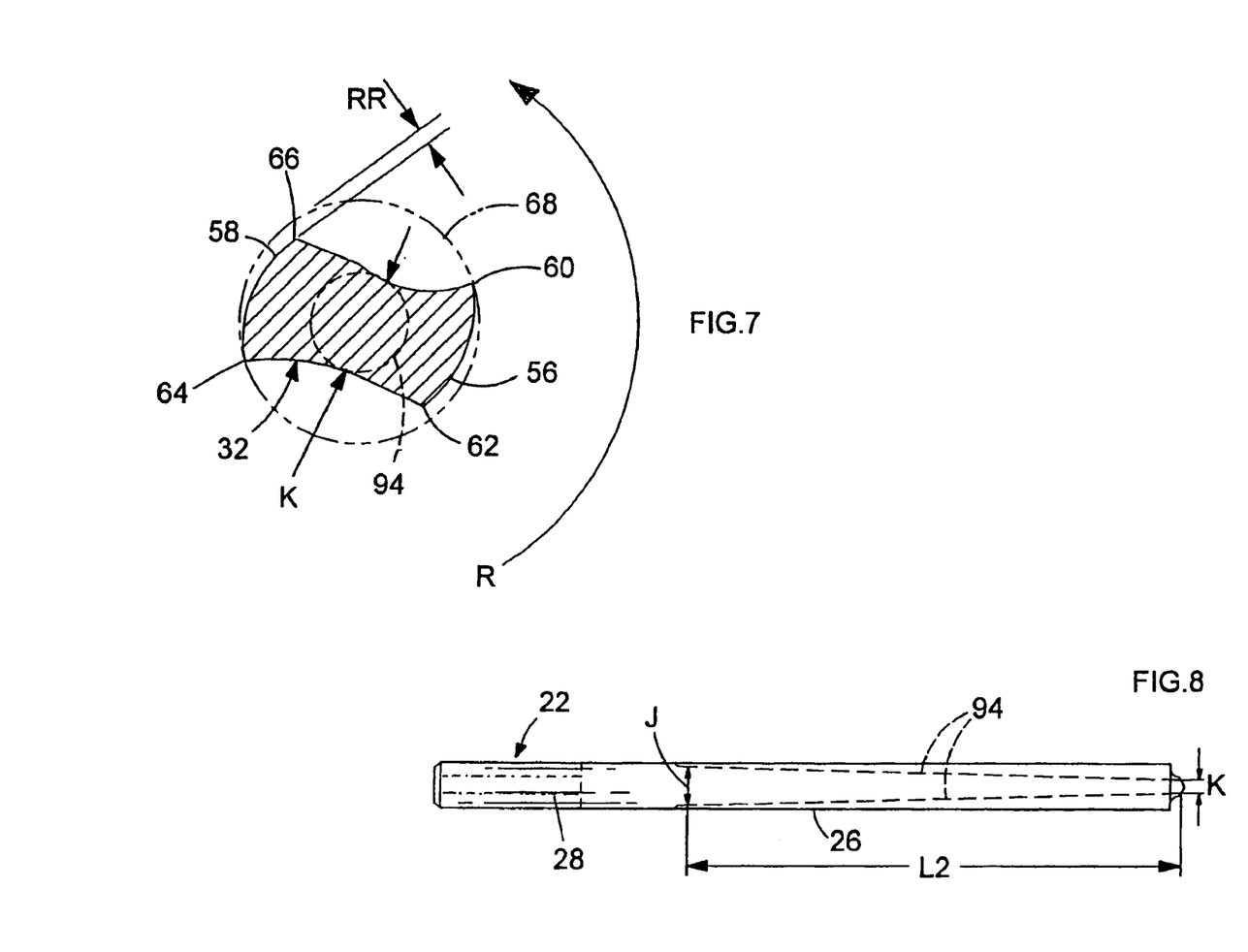
FIG. 7 is a section along the line Z-Z through a pilot tip of the working end of the drill bit of FIG. 6.
FIG. 8 is a schematic side view of a web taper rate of the drill bit of FIG. 1.

Referring to FIGS. 7 and 8, the drill bit 20 has a core, or web, 94 extending from the working end 24 to where the fluted section 26 joins the shank 28. The web 94 is defined by the helical lands 32. The web 94 is shown in dashed lines and tapers radially outwardly as it extends axially rearward from the working end 24. The web 94 has a thickness K at the pilot tip 36 and a thickness J near where the fluted section 26 joins the shank 28. The web 94 has a uniform web thickness taper rate along a length L2 between the pilot tip 36 and the point on the web 94 at which web thickness J is measured. The web thickness K is selected to provide suitably deep flutes 34 to convey, in use, debris and chips from the pilot tip 36 and out of the hole. The smaller the web thickness K the greater depth of the flutes 34 at the pilot tip 36. The web thickness J and the web length L2 are selected to provide a suitably robust drill bit 20 in its middle region.

Returning to FIG. 5, the split point cutting edge arrangement of the pilot tip 36 is formed with a point angle PP defined by inner minor cutting edges 40, 42. The pilot point angle PP falls within the range of 130° to 140°. The outer portion is formed with an outer point angle OP defined by the major cutting edges 70, 72 which falls within the range of about 160° to about 182°. The length L1 of the pilot tip 36 falls within the range of about 30% to about 45% of the major diameter D.

The dimensions of the drill bit 20 change over the range major diameters D. Certain dimensions, such as those already mentioned above, vary only a small amount over the range of the major diameters D or remain constant, albeit within a certain tolerance band. Other dimensions, for example, the pitch S of the helical lands 32, the minor diameter d, the web thickness K, the web thickness J and the web length L2 change significantly over the range of major diameters D and these dimensions of the drill bit 20 are summarised in Table 1 below. Changes to such dimensions have a consequential effect on other features of the drill bit 20 such as the ratio between minor diameter d and the web thickness K (wherein d is expressed as a percentage of K), the ratio between the pitch S and the major diameter D (wherein S is expressed as a percentage of D), and the web taper rate, all of which are also included in Table 1.

Prior art drill bits have the same basic shape as the drill bit 20 and have many dimensions in common. However, certain important dimensions of the prior art drill bits not only change over the range of major diameters D but also change with respect to the corresponding dimensions of the drill bit 20. These dimensions are all summarised in Table 2 below and serve to compare features of the prior art drill bits with those of the drill bit 20 so as to explain the latter's improved performance.

TABLE 1

Drill bit 20.

| D (Inch) | D (mm) | S (mm) | Ratio S:D | d (mm) | K (mm) | Ratio d:K | L2 (mm) | L2 (% of D) | J (mm) | Web Taper (mm/mm) |
|---|---|---|---|---|---|---|---|---|---|---|
| 1/8 | 3.175 | 12.5 | 394% | 1.9 | 0.81 | 234.6% | 24 | 756% | 2.4 | 0.066 |
| 9/64 | 3.572 | 14 | 392% | 2.15 | 0.84 | 256.0% | 26 | 728% | 2.6 | 0.068 |
| 5/32 | 3.969 | 15.5 | 391% | 2.38 | 0.86 | 276.7% | 33 | 831% | 3.05 | 0.066 |
| 11/64 | 4.366 | 17 | 389% | 2.59 | 0.88 | 294.3% | 35 | 802% | 3.2 | 0.066 |
| 3/16 | 4.763 | 19 | 399% | 2.78 | 0.91 | 305.5% | 39 | 819% | 3.6 | 0.069 |
| 13/64 | 5.159 | 20.5 | 397% | 2.95 | 0.93 | 317.2% | 42 | 814% | 3.75 | 0.067 |
| 7/32 | 5.556 | 22 | 396% | 3.11 | 0.95 | 327.4% | 43 | 774% | 3.9 | 0.069 |
| 15/64 | 5.953 | 23.5 | 395% | 3.26 | 0.98 | 332.7% | 46 | 773% | 4.1 | 0.068 |
| 1/4 | 6.353 | 25 | 394% | 3.4 | 1 | 340.0% | 48 | 756% | 4.25 | 0.068 |
| 17/64 | 6.747 | 26.5 | 393% | 3.53 | 1.02 | 346.1% | 50 | 741% | 4.6 | 0.072 |
| 9/32 | 7.144 | 28 | 392% | 3.65 | 1.05 | 347.6% | 53 | 742% | 4.7 | 0.069 |
| 19/64 | 7.541 | 30 | 398% | 3.77 | 1.07 | 352.3% | 55 | 729% | 4.9 | 0.070 |
| 5/16 | 7.938 | 31 | 391% | 3.88 | 1.09 | 356.0% | 59 | 743% | 5.1 | 0.068 |
| 21/64 | 8.334 | 33 | 396% | 3.99 | 1.12 | 356.3% | 62 | 744% | 5.3 | 0.067 |
| 11/32 | 8.731 | 34.5 | 395% | 4.09 | 1.14 | 358.8% | 64 | 733% | 5.5 | 0.068 |
| 23/64 | 9.128 | 36 | 394% | 4.19 | 1.17 | 358.1% | 67 | 734% | 5.6 | 0.066 |
| 3/8 | 9.525 | 37.5 | 394% | 4.28 | 1.19 | 359.7% | 69 | 724% | 5.8 | 0.067 |
| 25/64 | 9.922 | 39 | 393% | 4.37 | 1.21 | 361.2% | 69 | 695% | 6.55 | 0.077 |
| 13/32 | 10.319 | 40.5 | 392% | 4.45 | 1.24 | 358.9% | 72 | 698% | 6.8 | 0.077 |
| 27/64 | 10.716 | 42 | 392% | 4.53 | 1.26 | 359.5% | 74 | 691% | 6.9 | 0.076 |
| 7/16 | 11.113 | 44 | 396% | 4.61 | 1.28 | 360.2% | 78 | 702% | 7.1 | 0.075 |
| 29/64 | 11.509 | 45.5 | 395% | 4.69 | 1.31 | 358.0% | 80 | 695% | 7.3 | 0.075 |
| 15/32 | 11.906 | 47 | 395% | 4.76 | 1.33 | 357.9% | 83 | 697% | 7.6 | 0.076 |
| 31/64 | 12.303 | 48.5 | 394% | 4.83 | 1.35 | 357.8% | 87 | 707% | 7.7 | 0.073 |
| 1/2 | 12.7 | 50 | 394% | 4.9 | 1.38 | 355.1% | 89 | 701% | 7.3 | 0.067 |

TABLE 2 prior art drill bit.

| D (Inch) | D (mm) | S (mm) | Ratio S:D | d (mm) | K (mm) | Ratio d:K | L2 (mm) | L2 (% of D) | J (mm) | Web Taper (mm/mm) |
|---|---|---|---|---|---|---|---|---|---|---|
| 1/8 | 3.175 | 18 | 567% | 1.7 | 0.95 | 178.9% | 24 | 756% | 2.4 | 0.060 |
| 9/64 | 3.572 | 20 | 560% | 1.83 | 1 | 183.0% | 26 | 728% | 2.6 | 0.062 |
| 5/32 | 3.969 | 22 | 554% | 2.03 | 1.1 | 184.5% | 33 | 831% | 3.05 | 0.059 |
| 11/64 | 4.366 | 24 | 550% | 2.21 | 1.15 | 192.2% | 35 | 802% | 3.2 | 0.059 |
| 3/16 | 4.763 | 26 | 546% | 2.39 | 1.3 | 183.8% | 39 | 819% | 3.6 | 0.059 |
| 13/64 | 5.159 | 28 | 543% | 2.54 | 1.3 | 195.4% | 42 | 814% | 3.75 | 0.058 |
| 7/32 | 5.556 | 29 | 522% | 2.74 | 1.4 | 195.7% | 43 | 774% | 3.9 | 0.058 |
| 15/64 | 5.953 | 31 | 521% | 2.95 | 1.45 | 203.4% | 46 | 773% | 4.1 | 0.058 |
| 1/4 | 6.353 | 33 | 519% | 3.12 | 1.5 | 208.0% | 48 | 756% | 4.25 | 0.057 |
| 17/64 | 6.747 | 35 | 519% | 3.2 | 1.6 | 200.0% | 50 | 741% | 4.6 | 0.060 |
| 9/32 | 7.144 | 37 | 518% | 3.3 | 1.65 | 200.0% | 53 | 742% | 4.7 | 0.058 |
| 19/64 | 7.541 | 38 | 504% | 3.38 | 1.7 | 198.8% | 55 | 729% | 4.9 | 0.058 |
| 5/16 | 7.938 | 40 | 504% | 3.43 | 1.75 | 196.0% | 59 | 743% | 5.1 | 0.057 |
| 21/64 | 8.334 | 42 | 504% | 3.43 | 1.8 | 190.6% | 62 | 744% | 5.3 | 0.056 |
| 11/32 | 8.731 | 44 | 504% | 3.45 | 1.85 | 186.5% | 64 | 733% | 5.5 | 0.057 |
| 23/64 | 9.128 | 46 | 504% | 3.58 | 1.85 | 193.5% | 67 | 734% | 5.6 | 0.056 |
| 3/8 | 9.525 | 48 | 504% | 3.66 | 1.9 | 192.6% | 69 | 724% | 5.8 | 0.057 |
| 25/64 | 9.922 | 50 | 504% | 3.78 | 1.95 | 193.8% | 69 | 695% | 6.55 | 0.067 |
| 13/32 | 10.319 | 50 | 485% | 3.94 | 2 | 197.0% | 72 | 698% | 6.8 | 0.067 |
| 27/64 | 10.716 | 52 | 485% | 4.09 | 2 | 204.5% | 74 | 691% | 6.9 | 0.066 |

TABLE 2-continued prior art drill bit.

| D (Inch) | D (mm) | S (mm) | Ratio S:D | d (mm) | K (mm) | Ratio d:K | L2 (mm) | L2 (% of D) | J (mm) | Web Taper (mm/mm) |
|---|---|---|---|---|---|---|---|---|---|---|
| 7/16 | 11.113 | 54 | 486% | 4.24 | 2.05 | 206.8% | 78 | 702% | 7.1 | 0.065 |
| 29/64 | 11.509 | 56 | 487% | 4.39 | 2.1 | 209.0% | 80 | 695% | 7.3 | 0.065 |
| 15/32 | 11.906 | 58 | 487% | 5.52 | 2.2 | 250.9% | 83 | 697% | 7.6 | 0.065 |
| 31/64 | 12.303 | 60 | 488% | 4.67 | 2.2 | 212.3% | 87 | 707% | 7.7 | 0.063 |
| 1/2 | 12.7 | 61 | 480% | 4.83 | 2.3 | 210.0% | 89 | 701% | 7.3 | 0.056 |

As is common in the technical field of drill bits, all of the dimensions shown in Tables 1 and 2 are subject to a tolerance of plus or minus 7% for drill bits with the smallest major diameter D ranging down to plus or minus 2% for drill bits with the greatest major diameter D. The inventor believes that, when considering these tolerances, the benefits of the present invention gained by a ratio of pitch to major diameter (S:D) falling within a range of about 389% to about 398% (as shown in Table 1) extend to a range of about 380% to about 410% and, the benefits gained by a ratio of minor diameter to web thickness at the pilot tip (d:K) falling within a range of about 234.6% to about 361.2% (as shown in Table 1) extend to a range of about 220% to about 380%.

A comparison between the data of Tables 1 and 2 shows that the web length L2 and the web thickness J of the drill bit 20 and the prior art drill bit are equal across the range of major diameters D. This gives the drill bit 20 an equivalent robustness to the prior art drill bit around its middle region.

Also, the webs of the drill bit 20 and the prior art drill bit taper at constant rates. However, the web taper rate of the drill bit 20 falls within a range of about 0.066 mm/mm (i.e. web thickness reduces by 0.066 mm per mm of web length) to about 0.077 mm/mm. The web taper rate of the prior art drill bit falls within a range of 0.056 mm/mm to 0.062 mm/mm. This results in the drill bit 20 having a smaller web thickness K at the pilot tip 36 than the web thickness K of prior art drill bit with an equivalent major diameter D. This has the following two effects.

Firstly, the helical flutes 30 in the region of the pilot point 36 are deeper. This is significant because, during the drilling operation, the pilot tip 36 penetrates the opposite side of a workpiece before the outer cutting portion 34. The part of the workpiece behind the pilot tip 36 and in front of the outer cutting portion 34 is the final chip cut by the major cutting edges 70, 72 when the drilling operation is complete. There is always a risk that the final chip cut will remain partially attached to the workpiece around the mouth of the exit hole as the drill bit advances through the workpiece. This is called a burr. Burrs are undesirable if they remain attached to the workpiece around the mouth of the exit hole because they are sharp and unsightly. Small chips have little strength and present little resistance to the advancing outer cutting portion 34. The outer cutting portion, instead of cleanly cutting with its major cutting edges, simply bends the small chips out of its path so that they remain attached to the workpiece and form undesirable burrs. Bigger chips naturally have greater strength and remain in place as the outer cutting portion 34 advances. Thus, the bigger chips can be cleanly cut away by the major cutting edges 70, 72 without forming burrs. Therefore, the deep flute 30 of the drill bit 20 provides greater space to enable the formation of bigger final chips which are cut from the workpiece to form a clean exit hole without burrs.

Secondly, a reduced thickness of the circumferential outer face of each land 32 is a direct result of the reduction of the web thickness K. This also results in a sharpening of the leading edge 91 which defines the boundary between each flute 30 and the margin 90 of a respective trailing land 32 (in the direction of rotation R) in the region of the pilot tip 36. The sharpened leading edges 91 help to cut away any final chips missed by the major cutting edges 70, 72 to avoid such chips from becoming burrs at the mouth of the exit hole of the workpiece.

Further, the minor diameter d of the drill bit 20 is greater than the minor diameter d of prior art drill bits with an equivalent major diameter D. This maintains the strength of the pilot tip 36 by compensating for the reduced web thickness K, mentioned above. It also reduces the length of the major cutting edges 70, 72 which results in a smaller final chip and the attendant risk of forming burrs. However, the deeper flutes 30 formed by the reduced web thickness K counteracts this risk of forming burrs.

Furthermore, the pitch S of the drill bit 20 is smaller than the pitch S of prior art drill bits with an equivalent major diameter D. The pitch S of the drill bit 20 falls within a range of about 380% to about 410% of the major diameter D (allowing for normal tolerances). The pitch S of the prior art drill bit falls within a range of 470% to 580% (allowing for normal tolerances) of the major diameter D. Naturally, this results in more helical revolutions of the helical lands 32 and flutes 30 of the drill bit 20 per unit length of the fluted section 26 and a corresponding increase in the helix angle α. This reduces the cutting angle of both the outer minor cutting edges 44, 46 and the major cutting edges 70, 72 since the angles of inclination of the trailing minor relief faces 48, 50 and the major relief faces 74, 76, respectively, remain unchanged.

In use, the drill bit 20 can drill a hole in a workpiece more rapidly since the outer minor and the major cutting edges 44, 46; 70, 72 are more sharp. However, a faster drill bit is more likely to push a final chip out of the way rather than allowing the major cutting edges 70, 72 the time to cleanly cut it from the workpiece before it becomes a burr. Again, the deeper flutes 30 formed by the reduced web thickness K counteracts this risk of forming burrs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An elongate drill bit with a longitudinal axis (X-X) comprising:
   a shank;
   a working end; and a fluted section located between the shank and the working end, the shank, the working end and the fluted section are all formed integrally in the drill bit, the working end comprises an outer cutting portion and a central pilot tip extending axially ahead of the outer cutting portion, the pilot tip is formed with at least one pair of minor cutting edges arranged on opposite sides of the axis, and the outer cutting portion is formed with a pair of major cutting edges arranged on opposite sides of the axis, the outer cutting portion has a major diameter (D) defined by the pair of major cutting edges and the pilot tip has a minor diameter (d) defined by the at least one pair of minor cutting edges, the fluted section has a pair of helical lands each with a respective inner surface extending axially rearward from one of the major cutting edges and from one of the minor cutting edges, said helical lands and respective inner surfaces formed with a helix angle with respect to said axis, said major cutting edges having a rake face angle equal to said helix angle, and the helical lands define a web and each helical land defines a respective helical flute, the helical lands have a pitch (S) and the web has a web thickness (K) at the pilot tip, the ratio of pitch to major diameter (S:D) falls within a range of about 380% to about 410% and the ratio of minor diameter to web thickness at the pilot tip (d:K) falls within a range of about 220% to about 380%.

2. A drill bit as claimed in claim 1, wherein the pilot tip is formed with a pair of outer minor cutting edges each tapering radially outwardly from a respective inner cutting edge to the periphery of the minor diameter of the pilot tip.

3. A drill bit as claimed in claim 2, wherein the inner minor cutting edges are separated by a chisel edge perpendicular to the axis.

4. A drill bit as claimed in claim 2, wherein the pair of helical lands and respective land inner surfaces are formed with a helix angle α measured with respect to the axis, the helix angle falls within a range of about 37° to about 40°.

5. A drill bit as claimed in claim 4, wherein each outer minor cutting edge forms a boundary between a respective land inner surface and a respective minor relief face and each major cutting edge forms a boundary between a respective land inner surface and a respective major relief face.

6. A drill bit as claimed in claim 1, wherein the pilot tip extends axially ahead of the outer cutting portion by a distance (L1), the distance (L1) falls within a range of about 30% to about 45% of the major diameter.

7. A drill bit as claimed in claim 6, wherein the pilot tip is formed with a pair of circumferential outer surfaces each extending axially rearward on opposite sides of the pilot tip, the outer surfaces taper radially inwardly as they extend axially rearward, and the angle of rearward taper (T) of the outer surfaces falls with a range of about 1° to about 3° measured from a plane parallel to the axis.

8. A drill bit as claimed in claim 1, wherein the web tapers radially outward as it extends axially rearward from the working end.

9. A drill but as claimed in claim 8, wherein the web has a uniform taper rate falling within the range of about 0.066 mm/mm to about 0.077 mm/mm.

10. A drill bit as claimed in claim 1, wherein each helical land has a helical margin on a leading edge of its circumferential outer face (in a direction of rotation R), wherein each margin protrudes radially slightly beyond the circumferential outer face of a respective land and wherein each margin is narrower than the circumferential outer face of a respective land, wherein the helix defined by each margin has the major diameter.

11. A drill bit as claimed in claim 1, wherein the shank has a plurality of axially parallel flat chamfers arranged equiangularly around its circumference.

12. An elongate drill bit with a longitudinal axis (X-X) comprising:

a shank;

a working end; and a fluted section located between the shank and the working end, the shank, the working end and the fluted section are all formed integrally in the drill bit, the working end comprises an outer cutting portion and a central pilot tip extending axially ahead of the outer cutting portion, the pilot tip is formed with at least one pair of minor cutting edges arranged on opposite sides of the axis, and the outer cutting portion is formed with a pair of major cutting edges arranged on opposite sides of the axis, the outer cutting portion has a major diameter (D) defined by the pair of major cutting edges and the pilot tip has a minor diameter (d) defined by the at least one pair of minor cutting edges, the fluted section has a pair of helical lands each with a respective inner surface extending axially rearward from one of the major cutting edges and from one of the minor cutting edges, said helical lands and respective inner surfaces formed with a helix angle with respect to said axis, said major cutting edges having a rake face angle equal to said helix angle, and the helical lands define a web and each helical land defines a respective helical flute, the helical lands have a pitch (S) and the web has a web thickness (K) at the pilot tip, the ratio of pitch to major diameter (S:D) falls within a range of about 380% to about 410% and the ratio of minor diameter to web thickness at the pilot tip (d:K) falls within a range of about 220% to about 380%; and the pair of helical lands and respective land inner surfaces are formed with a helix angle α measured with respect to the axis, the helix angle falls within a range of about 37° to about 40°.

13. An elongate drill bit with a longitudinal axis (X-X) comprising:

a shank;

a working end; and a fluted section located between the shank and the working end, the shank, the working end and the fluted section are all formed integrally in the drill bit, the working end comprises an outer cutting portion and a central pilot tip extending axially ahead of the outer cutting portion, the pilot tip is formed with at least one pair of minor cutting edges arranged on opposite sides of the axis, and the outer cutting portion is formed with a pair of major cutting edges arranged on opposite sides of the axis, the outer cutting portion has a major diameter (D) defined by the pair of major cutting edges and the pilot tip has a minor diameter (d) defined by the at least one pair of minor cutting edges, the fluted section has a pair of helical lands each with a respective inner surface extending axially rearward from one of the major cutting edges and from one of the minor cutting edges, said helical lands and respective inner surfaces formed with a helix angle with respect to said axis, said major cutting edges having a rake face angle equal to said helix angle, and the helical lands define a web and each helical land defines a respective helical flute, the helical lands have a constant pitch (S) and the web has a web thickness (K) at the pilot tip, the ratio of pitch to major diameter (S:D) falls within a range of about 380% to about 410% and the ratio of minor diameter to web thickness at the pilot tip (d:K) falls within a range of about 220% to about 380%.

* * * * *